(12) United States Patent
Cheng et al.

(10) Patent No.: US 8,429,642 B1
(45) Date of Patent: Apr. 23, 2013

(54) VIRAL UPDATING OF SOFTWARE BASED ON NEIGHBOR SOFTWARE INFORMATION

(75) Inventors: Wen-Hao Cheng, Taipei (TW); Jul-Li Chiu, Taipei (TW); Chien-Liang Wang, Taipei (TW); Heng-Ming Fu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 1837 days.

(21) Appl. No.: 11/452,864

(22) Filed: Jun. 13, 2006

(51) Int. Cl.
- G06F 9/44 (2006.01)
- G06F 15/16 (2006.01)
- G06F 15/173 (2006.01)
- G06F 15/177 (2006.01)

(52) U.S. Cl.
USPC ........... 717/173; 717/170; 709/202; 709/221; 709/224; 709/225

(58) Field of Classification Search .................. None
See application file for complete search history.

(56) References Cited

U.S. PATENT DOCUMENTS

| | | | | |
|---|---|---|---|---|
| 5,581,764 A * | 12/1996 | Fitzgerald et al. | ............ | 709/223 |
| 5,684,952 A * | 11/1997 | Stein | ............ | 709/221 |
| 5,732,275 A * | 3/1998 | Kullick et al. | ............ | 717/170 |
| 5,764,992 A * | 6/1998 | Kullick et al. | ............ | 717/170 |
| 5,796,736 A * | 8/1998 | Suzuki | ............ | 370/254 |
| 5,948,104 A * | 9/1999 | Gluck et al. | ............ | 726/24 |
| 6,047,129 A * | 4/2000 | Frye | ............ | 717/172 |
| 6,052,803 A * | 4/2000 | Bhatia et al. | ............ | 714/49 |
| 6,117,188 A * | 9/2000 | Aronberg et al. | ............ | 717/176 |
| 6,167,567 A * | 12/2000 | Chiles et al. | ............ | 717/173 |
| 6,392,997 B1 * | 5/2002 | Chen | ............ | 370/252 |
| 6,480,900 B1 * | 11/2002 | Habert | ............ | 709/245 |
| 6,484,315 B1 * | 11/2002 | Ziese | ............ | 717/173 |
| 6,687,755 B1 * | 2/2004 | Ford et al. | ............ | 709/245 |
| 6,802,061 B1 * | 10/2004 | Parthasarathy et al. | ....... | 717/173 |
| 6,986,134 B1 * | 1/2006 | Foster | ............ | 717/177 |
| 7,089,552 B2 * | 8/2006 | Atallah | ............ | 717/175 |
| 7,117,264 B2 * | 10/2006 | Becker et al. | ............ | 709/227 |
| 7,376,945 B1 * | 5/2008 | Kakumani et al. | ............ | 717/171 |
| 7,424,745 B2 * | 9/2008 | Cheston et al. | ............ | 726/24 |
| 7,458,073 B1 * | 11/2008 | Darling et al. | ............ | 717/168 |
| 7,461,374 B1 * | 12/2008 | Balint et al. | ............ | 717/174 |
| 7,496,911 B2 * | 2/2009 | Rowley et al. | ............ | 717/174 |
| 7,506,335 B1 * | 3/2009 | Wooff et al. | ............ | 717/173 |
| 7,673,021 B2 * | 3/2010 | Tasker et al. | ............ | 709/220 |
| 7,814,480 B2 * | 10/2010 | Sakuda et al. | ............ | 717/173 |
| 2002/0078437 A1 * | 6/2002 | Grassman et al. | ............ | 717/168 |
| 2003/0112764 A1 * | 6/2003 | Gaspard et al. | ............ | 370/252 |

(Continued)

OTHER PUBLICATIONS

Merit E. Gerich, RFC 1466 Guidelines for management of IP address Space, published May 1993, pp. 1-10.*

(Continued)

*Primary Examiner* — Tuan Q. Dam
*Assistant Examiner* — Zheng Wei
(74) *Attorney, Agent, or Firm* — IPSG, P.C. Intellectual Property Law

(57) ABSTRACT

A computer-implemented method for virally updating software in a networked computer including performing neighbor computer discovery using the networked computer to ascertain neighbor computers and ascertaining, using the networked computer, whether any of the neighbor computers possesses an update package configured for updating the software. If a neighbor computer of the neighbor computers possesses the update package, the method includes retrieving the update package to the networked computer and updating the software in the networked computer using the update package.

20 Claims, 3 Drawing Sheets

U.S. PATENT DOCUMENTS

| | | | |
|---|---|---|---|
| 2003/0212734 A1* | 11/2003 | Stewart | 709/201 |
| 2003/0217358 A1* | 11/2003 | Thurston et al. | 717/174 |
| 2004/0064812 A1* | 4/2004 | Tachiyama | 717/170 |
| 2004/0107417 A1* | 6/2004 | Chia et al. | 717/171 |
| 2004/0168165 A1* | 8/2004 | Kokkinen | 717/168 |
| 2005/0038889 A1* | 2/2005 | Frietsch | 709/224 |
| 2005/0039178 A1* | 2/2005 | Marolia et al. | 717/168 |
| 2005/0132354 A1* | 6/2005 | Edwards et al. | 717/174 |
| 2005/0138157 A1* | 6/2005 | Jung et al. | 709/223 |
| 2005/0198218 A1* | 9/2005 | Tasker et al. | 709/220 |
| 2005/0257205 A1* | 11/2005 | Costea et al. | 717/168 |
| 2005/0257218 A1* | 11/2005 | Lin | 717/178 |
| 2006/0056411 A1* | 3/2006 | Badat et al. | 370/392 |
| 2006/0080656 A1* | 4/2006 | Cain et al. | 717/174 |
| 2006/0123413 A1* | 6/2006 | Collet et al. | 717/174 |
| 2006/0130042 A1* | 6/2006 | Dias et al. | 717/168 |
| 2006/0203827 A1* | 9/2006 | Absillis | 370/395.54 |
| 2006/0248522 A1* | 11/2006 | Lakshminarayanan et al. | 717/174 |
| 2007/0133544 A1* | 6/2007 | Shida | 370/392 |
| 2007/0150558 A1* | 6/2007 | Teodosiu et al. | 709/220 |
| 2007/0220506 A1* | 9/2007 | Maruyama | 717/168 |
| 2007/0266175 A1* | 11/2007 | Bitterlich | 709/242 |
| 2007/0283346 A1* | 12/2007 | Delgrosso et al. | 717/176 |
| 2008/0209413 A1* | 8/2008 | Kakumani et al. | 717/172 |
| 2008/0209414 A1* | 8/2008 | Stein | 717/173 |
| 2010/0070967 A1* | 3/2010 | Doui | 717/173 |

OTHER PUBLICATIONS

Rekhter et al., RFC 1918, Address Allocaiton for Private Internets, published Feb. 1996, pp. 1-9.*

* cited by examiner

VIRAL UPDATING OF SOFTWARE BASED ON NEIGHBOR SOFTWARE INFORMATION

BACKGROUND OF THE INVENTION

Computer hardware and software are ubiquitous nowadays. Once the province of a few privileged individuals or institutions, computers are now used for both work and entertainment by ordinary people. In the work environment, computers are often networked to share common resources and to facilitate the sharing of information. It is indeed an anomaly these days to find an office environment without some type of networked computing arrangement, whereby a plurality of computers are interconnected to share a common resource (such as a large file server) or to exchange information (such as emails, files, etc.).

Computers comprise both hardware and software. In a typical modern computer, there may exist dozens or hundreds of software programs, each implementing a particular set of functionalities and having particular capabilities. From time-to-time, these software packages need to be updated with more updated code and/or data. For example, most computers these days are protected by some type of anti-malware software to guard against the threat malware (e.g., spam emails, viruses, spywares, etc.) The anti-malware software typically employs a definition file, which may for example contain the fingerprint of viruses. In this example, the definition file needs to be updated frequently to ensure that the protection afforded by the anti-malware software can stay ahead of the viruses being released. From time to time, even the executable code (e.g., engine) of the anti-malware software needs to be updated in order to, for example, improve the virus-scanning engine's ability to detect and neutralize sophisticated viruses.

Updating software (defined to herein as updating the executable code and/or updating the data files employed by the executable code during execution and/or configuration) has been viewed as a burdensome task for both the network administrator and the resources of the network. While significant progresses have been made in automating the task of updating software, certain bottlenecks remain. In an example scenario, one or more specialized update servers are employed to update the software residing in networked client computers. Each networked client computer is loaded with an update agent, whose task is to access the update servers to ascertain whether there exist downloadable update packages for the software in each respective computer. By providing the specialized update server with the downloadable update package, one can count on the update agents executing in the client computers to automatically obtain the downloadable update package from the update servers to update their own software, if need.

Although automation has made network administration less tedious, such automation has resulted in degraded network performance. Consider, for example, a network having 500 client computers, all coupled to receive update information and update packages from a few update servers. These 500 client computers continually query the update servers to ascertain whether a downloadable update package exists Such frequent and continual queries represent a drain on the I/O bandwidth of the update servers, rendering the servers less capable of performing other network I/O tasks. Further, if the update server is provided with a new downloadable update package, the various client computers would attempt to download the update package in order to update their own software. If the update package is sizable, e.g., tens or hundreds of megabytes, the attempt by a large number of client computers to download the update package from the update server would create a network bandwidth bottleneck and may cause other network traffic to slow down or may even render it impossible to use the network for any other purposes for quite some time.

SUMMARY OF INVENTION

The invention relates, in an embodiment, to a computer-implemented method for virally updating software in a set of networked computers. The set of networked computers represents a plurality of computers coupled to communicate in a network. The method includes performing, for each computer of the set of networked computers, neighbor computer discovery. The neighbor computer discovery is configured to ascertain the identity of a set of neighbor computers. Each computer in the set of neighbor computers is both viral-update enabled and a neighbor with the each computer of the set of networked computers, wherein the performing neighbor computer discovery for the each computer of the set of networked computers is performed by the each computer of the set of networked computers on its own behalf.

The method also includes performing, for each computer of the set of networked computers, neighbor software status check. The neighbor software status check is configured to determine software status information in the set of neighbor computers for the each computer of the set of networked computers, wherein the performing neighbor software status check for the each computer of the set of networked computers is performed by the each computer of the set of networked computers on its own behalf.

The method additionally includes performing viral software update for the each computer of the set of networked computers using the software status information associated with the each computer of the set of networked computers. The performing the viral software update includes updating, if the neighbor software status check for a first networked computer of the set of networked computers reveals that at least a first neighbor computer in the set of neighbor computers for the first networked computer possesses a more updated version of the software, updating the software in the first networked computer using an update package received from the first neighbor computer.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
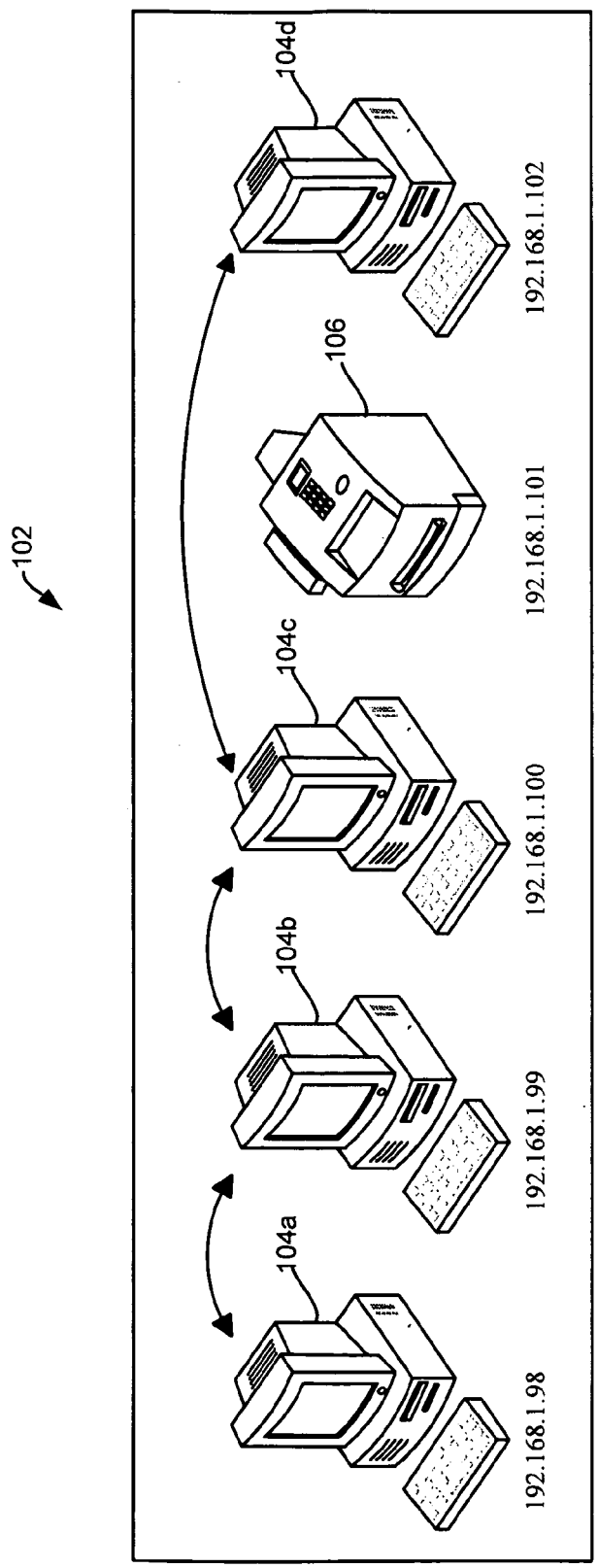
FIG. 1 shows, in accordance with an embodiment of the present invention, an example computer network comprising four viral-update enabled computers and a printer.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In an embodiment, the invention relates to a method for virally updating software in networked computers that are coupled to communicate with one another in computer network. In viral updating, each computer ascertains the identity and the software status of the neighbor computers. If any of the neighbor computers of a given computer has a more up-to-date version of the software (either executable code or data), the given computer employs an update package from the neighbor computer that possesses the more up-to-date version of the software to update its own software. The cycle of identity discovery/software status determination/software updating occurs periodically based on a predefined or programmable schedule.

In this manner, if only one computer in the network has the latest version of the software, the next neighbor identity discovery/software status determination/software updating will result in its neighbors having their software updated. Each neighbor identity discovery/software status determination/software updating cycle thereafter results in more and more computers being updated. Updating thus propagates like wave from computer to computer with each cycle until all computers are updated.

As the term is employed herein, software (in the context of software updating virally) refers broadly to the executable code of a software program (or a portion thereof). Alternatively or additionally, software (in the context of software updating virally) may also refer to the data, pattern, or parameters employed during the execution and/or configuration of the executable code. For example, a virus scanning software package (such as one available from TrendMicro, Inc. of Cupertino, DA) may include the executable code in the form of the scanning engine and/or a virus definition data file, both of which may need to be updated from time-to-time and both of which may be thought of as "software" to be virally updated in the context of the present invention. The term "viral" in the context of "virally updating" or "viral updating" describes the self-propagating updating activity from computer to computer in the network.

Since each computer performs the identity discovery/software status determination/software updating on behalf of itself, there is no need to maintain a central update server. Further, since the updating propagates and occurs automatically from cycle to cycle, the process is essentially automatic and requiring no further operator intervention until all computers are updated. Additionally, since only a small set of neighboring computers are updated with each cycle, there is little risk of suddenly overloading the network with update traffic. By using update packages from neighboring computers to update, any update-related traffic would be locally confined between neighbors, further reducing impact on network traffic.

The features and advantages of the present invention may be better understood with reference to the figures and discussions that follow. FIG. 1 shows, in accordance with an embodiment of the present invention, an example network 102 comprising four networked computers 104a, 104b, 104c, 104d, and a printer 106. Each of networked computers 104a, 104b, 104c, and 104d is loaded with a viral update agent (not shown) to enable each of these computers to perform the viral updating tasks using information provided by its neighbors. Printer 106, on the other hand, represents a different class of device and is not provided with the software agent in the example of FIG. 1.

Upon initiation, the viral update agent in each of networked computers 104a, 104b, 104c, and 104d performs neighbor computer discovery on its own behalf by ascertaining which of the closest neighbor computers are viral-update enabled, i.e., endowed with the viral update agent. In an embodiment, each viral-update enabled computer is configured by the viral update agent to respond affirmatively to an inquiry by a neighbor viral-update enabled computer. The number of computers in a set of neighbor computers for a given computer (for example, for computer 104b) may be 2 or, depending on the definition provided or configuration setting, there may be any number of viral update-enabled computers in a given set of neighbor computers.

In the example of FIG. 1, the set of neighbor computers for each computer is defined to be one-up-one-down, i.e., the closest two viral update-enabled computers that straddle the computer that queries for its neighbors. With respect to computer 104b, the two closest viral-update enabled computers that straddle computer 104b are computers 104a and 104c. With respect to computer 104c, the two closest viral-update enabled computers that straddle computer 104c are computers 104b and 104d. Note that when computer 104c is performing its neighbor computer discovery, printer 106 is ignored since it has not been loaded with its own viral software update agent. With respect to computer 104d, the closest viral-update enabled computer is computer 104c. With respect to computer 104a, the closest viral-update enabled computer is computer 104b.

In an embodiment, the IP address of each computer is employed to ascertain its neighbors. In the example of FIG. 1, computer 104c has an IP address of 192.168.1.100. If the neighbor computers are defined to be the viral-update enabled computers that have the two closest occupied IP addresses straddling the IP address of computer 104c (i.e., one-up-one-down), the neighbor computers of computer 104c would be computer 104b and computer 104d (having IP addresses of 192.168.1.99 and 192.168.1.102 respectively). Notice that computer 104a is not chosen since between computer 104a and computer 104b, computer 104b is the computer with having a closer occupied IP address. Between computer 104a and computer 104d, the IP address of computer 104d along the IP address of computer 104b straddle the IP address of computer 104c and therefore better fit the requirements of neighbor computers in this example.

Once the neighbor computers are identified, each of computers 104a, 104b, 104c, and 104d performs on its own behalf neighbor software status check to obtain software status information from its neighbors. The software status information enables each computer to ascertain how up-to-date its own software is relative to other computers its set of neighbor computers. In an embodiment, neighbor software status check involves collecting the version number or the release date of the software in the neighbor computers. Thus, in an embodiment, the viral update agent in each viral-update enabled computer is configured to respond to an inquiry by a neighbor computer with the software status information it has collected from its own computer. By comparing the collected version numbers and/or collected release dates against the version number and/or the release date of its own software, a computer (or the viral update agent in that computer) can ascertain whether its own software needs updating to the version possessed by the neighbor or to the version offered by the update package.

Once the software status information is obtained, a computer (e.g., computer 104b) may begin downloading update package(s) from its neighbor computer(s), such as from computer 104c, if the software status information indicates that its software is out of date relative to the software in the neighbor computer 104c. Once downloading is complete, computer 104b may begin installing the downloaded update package. After installation is complete, computer 104b retains the update package to pass on to a neighbor if needed.

In an embodiment, the viral-update enabled computer queries its neighbor computer for the existence of an update package that it can use to update itself. If such update package exists, the viral-update enabled computer would download the update package to update its own software. Thus, even if the neighbor computer may not be able to update its software (due to, for example, the fact that the neighbor computer may have incompatible software/hardware for updating to the latest version), a viral-update enabled computer may still acquire the update package to update its own software to a higher or later version than one that exists in the neighbor computer. In another embodiment, a viral-update enabled computer queries for and downloads a more up-to-date update package even if it could not use the update package itself for updating purposes (due to, for example, incompatible software and/or hardware issues). Nevertheless, the downloading of a more up-to-date update package allows another neighbor computer to query for and obtains the update package in a cascading manner in a subsequent cycle, thus ensuring that all computers on the network have an opportunity to receive the update package for updating purposes. These and other behaviors may be configurable for a given viral-update enabled computer based on predefined or programmable configuration parameters.

The cycle of neighbor identity discovery/software status determination/software updating may be repeated periodically or at predefined times as specified by the network administrator. In an embodiment, the cycle of neighbor identity discovery/software status determination/software updating occurs every 10 minutes. The cycle time may be predefined to be a different value, or may be changed programmably, in a embodiment.

Note that during each cycle, only a limited number of networked computers download the update package and/or have their software updated. In subsequent cycles, the updating propagates virally among neighbor computers of the computer that has the most up-to-date software version and/or update package. For example, suppose computer 104a in FIG. 1 has been provided with the most up-to-date software. In cycle 1, its neighbor 104b is updated using an update package downloaded from computer 104a. In cycle 2, computer 104c is updated using an update package downloaded from computer 104b. The process continues until all computers are updated.

Figure 2:
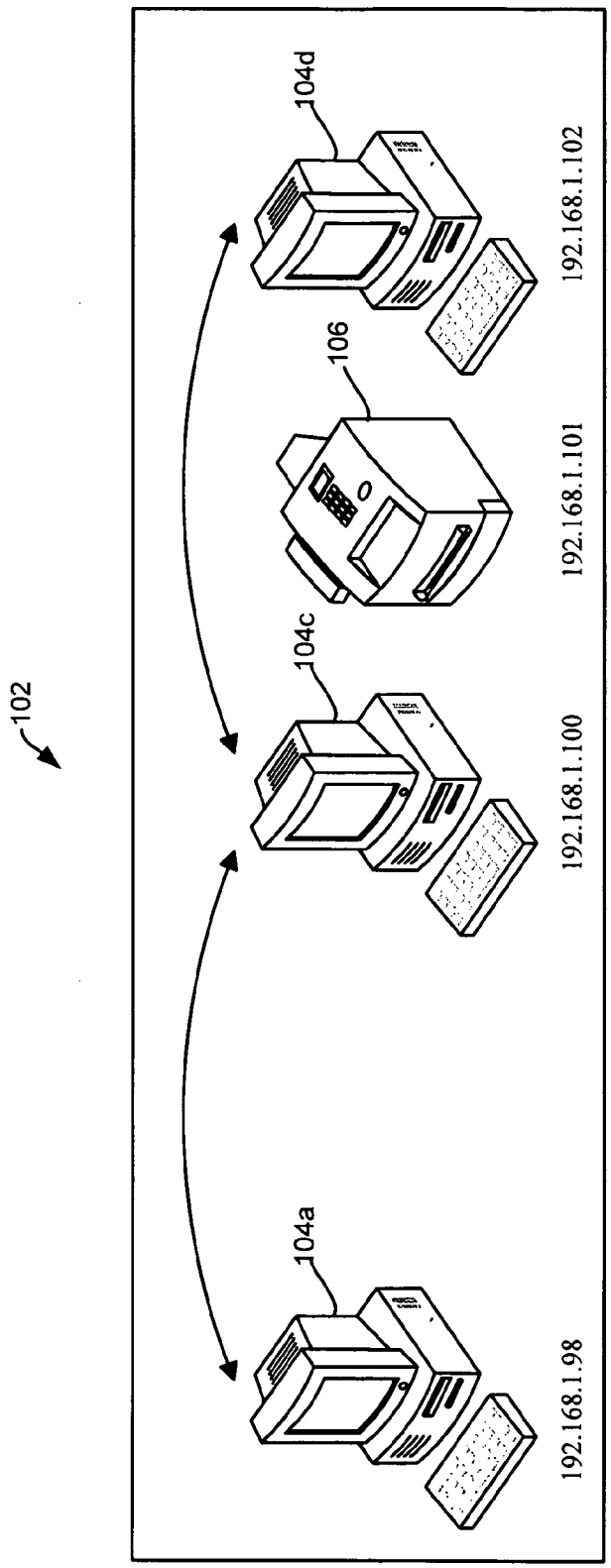
FIG. 2 shows the network of FIG. 1 after changes have been made to the network configuration.

At times, the network configuration may change. For example, a network administrator may add computers to or remove computers from the network. FIG. 2 shows an example, in an embodiment, of the network configuration at time t+8 minutes. Compared to the network configuration of FIG. 1 (which occurs at time t=0, for example), computer 104b has been removed. However, since the example specifies a cycle time of 10 minutes for the neighbor identity discovery/software status determination/software updating cycle, computer 104c is unaware that its neighbor has been removed. At time t=10 minutes, a new cycle begins and computer 104c can now ascertain that its neighbor computer is computer 104a instead of computer 104b. Likewise, computer 104a can now ascertain that its neighbor computer is computer 104c instead of computer 104b. From that time on, computers 104c and 104a regard one another as neighbor computers for the purpose of virally updating software.

Figure 3:
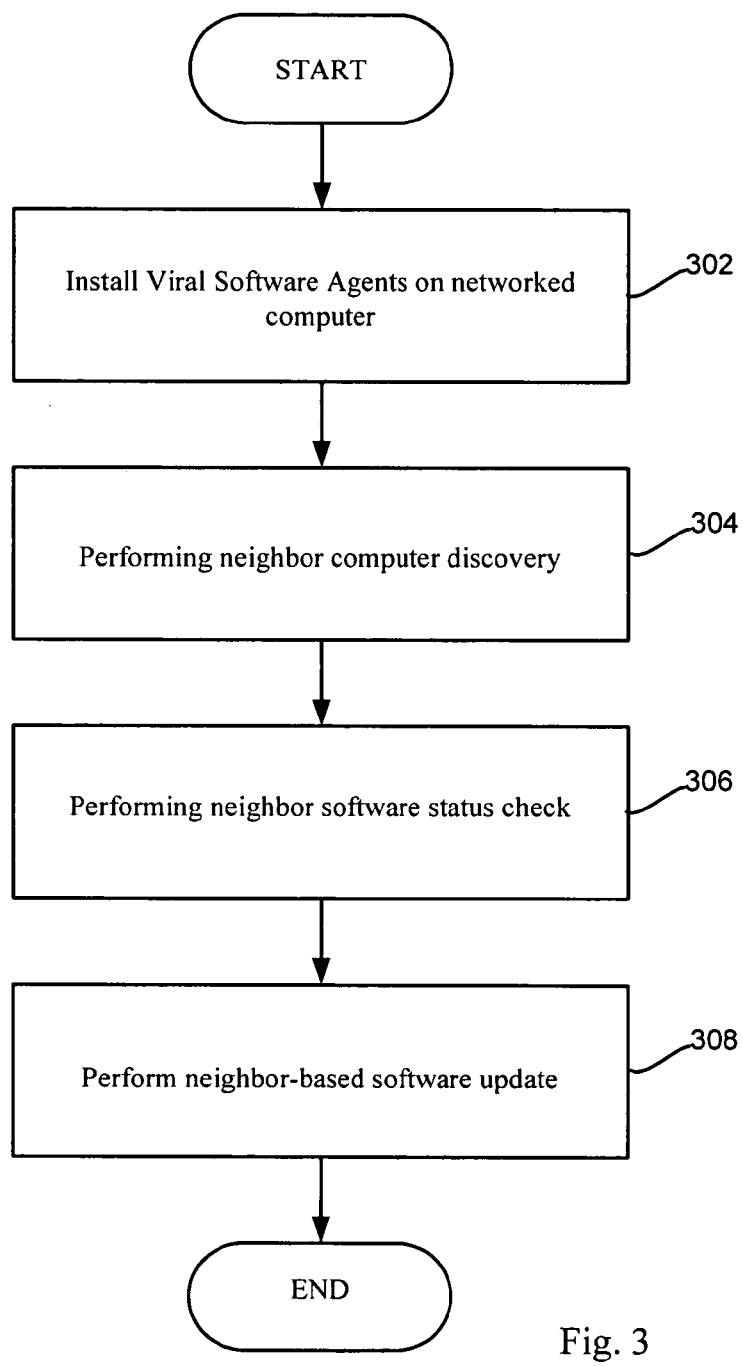
FIG. 3 shows, in accordance with an embodiment of the present invention, a flowchart of the steps involved in virally updating software.

FIG. 3 shows, in accordance with an embodiment of the present invention, a flowchart of the steps involved in virally updating software. In step 302, viral software agents are installed on computers of the network to render these computers viral-update enabled. In step 304, the viral software agent in each computer performs neighbor computer discovery to discover the set of neighbor computers. In step 306, the viral software agent in each computer performs neighbor software status check by consulting with its neighbor computers to obtain software status information. The software status information from the neighbor computers may be stored by each computer in a table for use in determining whether one or more of the neighbor computers possess software that is released later or has a latter version number. If one or more of the neighbor computers possesses software that is released later or has a latter version number (or has a more up-to-date update package), viral software update (or neighbor-based software update) is performed in step 308 whereby the computer retrieves an update package from the neighbor computer that has the software that is released later or has a latter version number or has a more up-to-date update package. The computer may then employ the update package from its neighbor(s) to update its own software. Steps 304, 306 and 308 of FIG. 3 may be repeated periodically or at predefined times to ensure that all computers are updated over time.

As discussed, the set of neighbor computers may be specified in various ways. For example, the set of neighbors may be specified to be one-up-one-down, i.e., a viral-update enabled computer having the next higher IP address than the IP address of the computer performing the self-update and a viral-update enabled computer having the next lower IP address relative to the IP address of the computer performing the self-update. However, it is also possible to specify the set of neighbors as two-up-two down, i.e., two viral-update enabled computers having the next two higher IP addresses than the IP address of the computer performing the self-update and two viral-update enabled computers having the next two lower IP addresses relative to the IP address of the computer performing the self-update. It is also possible to specify the set of neighbors as three-up-three-down, four-up-four-down, etc.

The number of neighbor computers in a set do not have to be symmetrical on either side of the computer performing the self-update. For example, it is also possible to specify the set of neighbors as one-up-two-down, i.e., one viral-update enabled computer having the next higher IP address than the IP address of the computer performing the self-update and two viral-update enabled computers having the next two lower IP addresses relative to the IP address of the computer performing the self-update. As another example, it is also possible to specify the set of neighbors as one-down, i.e., one viral-update enabled computer having the next lower IP address relative to the IP address of the computer performing the self-update.

While this invention has been described in terms of several preferred embodiments, there are alterations, permutations, and equivalents, which fall within the scope of this invention. Although various examples are provided herein, it is intended that these examples be illustrative and not limiting with respect to the invention. For example, the term "computer" in the context of a networked computer should be understood to include any electronic device that can be loaded with a viral update agent for the purpose of performing the neighbor device(s) identification, performing the neighbor software status check, and downloading update packages to perform self-update. As another example, although IP address is employed to ascertain neighbor computers, any other form of computer identification may be employed in conjunction with an appropriate neighbor computer identification scheme to ascertain neighbor computers. It should also be noted that there are many alternative ways of implementing the methods and apparatuses of the present invention. Further, the abstract is provided herein for convenience and should not be employed to construe or limit the overall invention, which is expressed in the claims.

It is therefore intended that the following appended claims be interpreted as including all such alterations, permutations, and equivalents as fall within the true spirit and scope of the present invention.

What is claimed is:

1. A computer-implemented method for updating software in a set of networked computers, said set of networked computers representing a plurality of computers coupled to communicate in a network, said plurality of computers including at least as first computer associated with a first IP address and having first software, a second computer associated with a second IP address and having second software, a third computer associated with a third IP address and having third software, and a fourth computer associated with a fourth IP address and having fourth software, the computer-implemented method comprising:

using said second computer and employing at least said first IP address, said second IP address, said third IP address, and said fourth IP address to determine a set of neighbor computers of said second computer, ascertaining, using said second computer, that said set of neighbor computers of said second computer includes at least said first computer and said third computer, but not said fourth computer, at least by determining that the value of said second IP address is closer to the value of said first IP address than to the value of said fourth IP address and that the value of said second IP address is closer to the value of said third IP address than to the value of said fourth IP address, wherein the value of said second IP address is between the value of said first IP address and the value of said third IP address;

after said ascertaining, checking, using said second, computer, software status information of a first copy of an update package in said first computer to determine whether said update package is more up-to-date than said second software, said update package being related to said second software;

after said checking, downloading, using said second computer, a second copy of said update package from said first computer to said second computer; and after said downloading, providing, using said second computer, a third copy of said update package from said second computer to said third computer.

2. The computer-implemented method of claim 1 further comprising:

after said providing, passing, using said third computer, a fourth copy of said update package from said third computer on to said fourth computer, the value of said third IP address being between the value of said second IP address and the value of said fourth IP address; and updating, using said fourth computer, said fourth software with said fourth copy of said update package.

3. The computer-implemented method of claim 1 further comprising updating said third software with said third copy of said update package.

4. The computer-implemented method of claim 1 further comprising:

storing said third copy of said update package in said third computer without updating said third software with said third copy of said update package, said update package being incompatible with at least one of said third software and hardware of said third computer for updating purposes; and providing a fourth copy of said update package to said fourth computer, the value of said third IP address being between the value of said second IP address and the value of said fourth IP address.

5. The computer-implemented, method of claim 1 further comprising:

determining, using said second computer, whether said first computer includes a copy of an update agent;

judging, using said fourth computer, that a device associated with a fifth IP address does not include any copy of said update agent, the value of said fifth IP address being between said third IP address and said four IP address;

after said judging, querying using said four computer, whether said third computer includes any update package related to said fourth software, the value of said third IP address being between the value of said second IP address and the value of said fourth IP address:

after said querying, determining whether said update package is more up-to-date than said fourth software; and after determining that said update package is more up-to-date than said fourth software, downloading a fourth copy of said update package from said third computer to said fourth computer.

6. The computer-implemented method, of claim 1 further comprising periodically repeating said ascertaining, said checking, said downloading, and said providing.

7. The computer-implemented method of claim 1 further comprising:

querying, using said third computer, whether any further update package exists in said first computer after said second computer has been removed;

after determining that a first copy of a second update package exists in said first computer, determining, using said third computer, whether said second update package is more up-to-date than said third software; and after determining that said second update package is more up-to-date than said third software, downloading, a second copy of said second update package from said first computer to said third computer.

8. The computer-implemented method of claim 1, wherein said software represents data.

9. The computer-implemented method of claim 1 wherein said software represents a virus definition data file.

10. The computer-implemented method of claim 1 wherein said software status information includes a version number.

11. The computer-implemented method of claim 1 wherein said software status information includes a release date.

12. A computer-implemented method for updating software in at least a networked computer among a plurality of networked computers, said plurality of networked computers including at least a first computer associated with a first IP address and having first software, a second computer associated with a second IP address and having second software, a third computer associated with a third IP address and having third software, and a fourth computer associated with a fourth IP address and having fourth software, the computer-implemented method comprising:
 performing neighbor computer discovery using said second computer to ascertain that said first computer and said third computer are neighbor computers of said second computer at least by determining that the value of said second IP address is closer to the value of said first IP address than to the value, of said fourth IP address and that the value of said second IP address is closer to the value of said third IP address than to the value of said fourth IP address, wherein the value of said second IP address is between the value of said first IP address and the value of said third IP address;
 after said performing said neighbor computer discovery, ascertaining, using said second computer, whether either of said first computer and said third computer includes any update package related to said second software;
 after ascertaining that said first computer includes a first copy of an update package related to said second software, downloading, using said second computer, a second copy of said update package from said first computer to said second computer; and
 after said downloading, providing, using said second computer, a third copy of said update package from said second computer to said third computer.

13. The computer-implemented method of claim 12 further comprising:
 after said providing, passing, using said third computer, a fourth copy of said update package from said third computer on to said fourth computer, the value of said third IP address being between the value of said second IP address and the value of said fourth IP address; and
 updating, using said fourth computer, said fourth software with said fourth copy of said update package.

14. The computer-implemented method of claim 12 further comprising updating said third software with said third copy of said update package.

15. The computer-implemented method of claim 12 further comprising:
 storing said third copy of said update package in said third computer without updating said third software with said third copy of said update package, said update package being incompatible with at least one of said third software and hardware of said third computer for updating purposes; and
 providing a fourth copy of said update package to said fourth computer, the value of said third IP address being between the value of said second IP address and the value of said, fourth IP address.

16. The computer-implemented method of claim 12 further comprising:
 determining, using said second computer whether said first computer includes a copy of an update agent;
 judging, using; said fourth computer, that a device associated with a fifth IP address does not include any copy of said update agent, the value of said fifth IP address being between said third IP address and said four IP address;
 after said judging, querying, using said four computer, whether said third computer includes any update package related to said fourth software, the value of said third IP address being between the value of said second IP address and the value of said fourth IP address;
 after said querying, determining whether said update package is more up-to-date than said fourth software; and
 after determining that said update package is more up-to-date than said fourth software, downloading a fourth copy of said update package from said third computer to said fourth computer.

17. The computer-implemented method of claim 12 wherein said software represents a virus definition data file.

18. The computer-implemented method of claim 12 further comprising:
 querying, using said third computer, whether any further update package exists in said first computer after said second computer has been removed;
 after determining that a first copy of a second update package exists in said first computer, determining, using said third computer, whether said second update package is more up-to-date than said third software, and
 after determining that said second update package is more up-to-date than said third software, downloading a second copy of said second update package from said first computer to said third computer.

19. The computer-implemented method of claim 12 further comprising: before said downloading, determining whether said update package is more up-to-date than said second software.

20. The computer-implemented method of claim 12 wherein said ascertaining, said downloading, and said providing are performed periodically.

* * * * *